United States Patent
Tupman et al.

(10) Patent No.: US 7,525,216 B2
(45) Date of Patent: Apr. 28, 2009

(54) PORTABLE POWER SOURCE TO PROVIDE POWER TO AN ELECTRONIC DEVICE VIA AN INTERFACE

(75) Inventors: David John Tupman, San Francisco, CA (US); Doug M. Farrar, Los Altos, CA (US); Joseph R. Fisher, Jr., San Jose, CA (US); Jesse L. Dorogusker, Menlo Park, CA (US); Donald J. Novotney, San Jose, CA (US)

(73) Assignee: Apple Inc., Cupertino, CA (US)

( * ) Notice: Subject to any disclaimer, the term of this patent is extended or adjusted under 35 U.S.C. 154(b) by 738 days.

(21) Appl. No.: 11/031,547

(22) Filed: Jan. 7, 2005

(65) Prior Publication Data
US 2006/0152084 A1    Jul. 13, 2006

(51) Int. Cl.
*H02J 3/14* (2006.01)
(52) U.S. Cl. ....................................................... 307/39
(58) Field of Classification Search ................. 307/126, 307/39
See application file for complete search history.

(56) References Cited

U.S. PATENT DOCUMENTS

| | | | |
|---|---|---|---|
| 4,673,861 A | 6/1987 | Dubovsky et al. |
| 5,150,031 A | 9/1992 | James et al. |
| 5,471,128 A | 11/1995 | Patino et al. |
| 5,754,027 A | 5/1998 | Oglesbee et al. |
| 5,845,217 A | 12/1998 | Lindell et al. |
| 6,007,372 A | 12/1999 | Wood |
| 6,130,518 A | 10/2000 | Gabehart et al. |
| 6,169,387 B1 | 1/2001 | Kaib |
| 6,184,652 B1 | 2/2001 | Yang |
| 6,184,655 B1 | 2/2001 | Malackowski |
| 6,204,637 B1 | 3/2001 | Rengan |
| 6,211,581 B1 | 4/2001 | Farrant |
| 6,211,649 B1 | 4/2001 | Matsuda |
| 6,252,380 B1 | 6/2001 | Koenck |
| 6,261,109 B1 | 7/2001 | Liu et al. |
| 6,271,605 B1 | 8/2001 | Carkner et al. |

(Continued)

FOREIGN PATENT DOCUMENTS

JP    2001-69165    3/2001

(Continued)

OTHER PUBLICATIONS

Full English Translation of Japanese Kokai Patent Application #2001-69165A, Takeshi Koura.

(Continued)

*Primary Examiner*—Stephen W Jackson
*Assistant Examiner*—Dru M Parries
(74) *Attorney, Agent, or Firm*—Townsend and Townsend and Crew LLP

(57) ABSTRACT

A portable power source is configured for use with an electronic device. The portable power source cooperates and communicates with the electronic device via a peripheral bus to which the electronic device is attachable. The portable power source includes circuitry to process a power request signal from the electronic device to determine whether a device connected to a bus interface of the portable power source is requesting power from the portable power source.

33 Claims, 4 Drawing Sheets

U.S. PATENT DOCUMENTS

| | | |
|---|---|---|
| 6,283,789 B1 | 9/2001 | Tsai |
| 6,316,916 B2 | 11/2001 | Bohne |
| 6,353,894 B1 | 3/2002 | Pione |
| 6,489,751 B2 | 12/2002 | Small et al. |
| 6,614,232 B1 | 9/2003 | Mukai |
| 6,799,226 B1 | 9/2004 | Robbin et al. |
| 2001/0003205 A1 | 6/2001 | Gilbert |
| 2001/0005641 A1 | 6/2001 | Matsumoto et al. |
| 2001/0006884 A1 | 7/2001 | Matsumoto |
| 2002/0156949 A1 | 10/2002 | Kubo et al. |
| 2003/0110403 A1 | 6/2003 | Crutchfield et al. |
| 2004/0082369 A1* | 4/2004 | Dayan et al. .............. 455/573 |
| 2004/0224638 A1 | 11/2004 | Fadell et al. |
| 2005/0084721 A1* | 4/2005 | Ikuma et al. .............. 429/22 |

FOREIGN PATENT DOCUMENTS

| | | |
|---|---|---|
| WO | WO 99/26330 | 5/1999 |
| WO | WO 00/39907 | 7/2000 |

OTHER PUBLICATIONS

Office Action mailed Dec. 15, 2005 in U.S. Appl. No. 10/125,893.
International Search Report in PCT application PCT/US05/024906 dated Mar. 15, 2006.
"Introduction to Public Key Cryptography," Oct. 9, 1998, printed from http://developer.netscape.com/docs/manuals/security/pkin/contents.htm on Oct. 6, 2004.
Bentrup, "Public Key Cryptography Demystified," Campus Technology, printed from http://www.campus-technology.com/article.asp?id=7626 on Oct. 6, 2004.
Whittle, "Public Key Authentication Framework: Tutorial," First Principles Consulting, Jun. 2, 1996.
Belkin iPod Voice Recorder, Product Specification Sheet, printed Jun. 16, 2004.
"A Serial Bus on Speed Diagram: Getting Connected with FireWire", downloaded Oct. 16, 2001, PC Magazine: PC Tech (A Serial Bus on Speed), wysiwyg://51/http://www.zdnet.com/pctech/content/18/10/tu1810.007.html.
"Cables to Go", download Oct. 16, 2001, http://www.cablestogo.com/product.asp?cat%5Fid=601&sku=27028.
"ExpressBus™ FU010 User Guide Packing Checklist", Belkin Components.
"FireWire Connector", downloaded Oct. 16, 2001, wysiwyg:///76/http://developer.apple.com/...es/Macintosh_CPUs-G3/ibook/ibook-27.html.
"FireWire", downloaded Oct. 16, 2001, wysiwyg://42/http://developer.apple.com/hardware/FireWire.
"How to Connect Your Computer, PC Hardware", downloaded Oct. 16, 2001, http:///www.scar.utoronto.ca/~ccweb/faculty/connect-howto.html.
"IEEE 1394/USB Comparison", downloaded Oct. 16, 2001, www.genitech.com.au/LIBRARY/TechSupport/infobits/firewire_vs_usb.htm.
"Making USB Work", downloaded Oct. 16, 2001, PC Magazine: PC Tech (Making USB Work) wysiwyg://55/http://www.zdnet.com/pcmag/pctech/content/18/04/tu1804.001.html.
"PMC FW2 IEEE1394 FireWire Controller", downloaded Oct. 16, 2001, http://www.bvmltd.co.uk/PMCfw2ds.html.
"Why FireWire is Hot!Hot!Hot!", downloaded Oct. 16, 2001, "Impact.FireWire.SideBar", http://www.vxm.com/21R.35.html.
Charles Severance, "FireWire Finally Comes Home", Computer, Nov. 1998, pp. 117-118.
Ian Fried, "FireWire poised to become ubiquitous", downloaded Oct. 16, 2001, CNET News.com, 1394 Trade Association: Press, wysiwyg://32/http://1394ta.org/Press/2001Press/august/8.27.b.html.
Ian Fried, "New FireWire to blaze faster trail", downloaded Oct. 16, 2001, CNET News.com. http://news.cnet.com/news/0-1006-200-6021210.html.
Michael D. Johas Teener, "Understanding FireWire: The IEEE 1394 Standards and Specifications", downloaded Oct. 16, 2001, wysiwyg://9/http://www.chipcenter.com/networking/ieee1394/main.html.
International Search Report in PCT application PCT/US02/33856 dated Mar. 14, 2003.
Office Action mailed Jun. 13, 2005 in U.S. Appl. No. 10/278,752.
Office Action mailed Nov. 3, 2004 in U.S. Appl. No. 10/125,893.
Final Office Action mailed May 17, 2005 in U.S. Appl. No. 10/125,893.

* cited by examiner

PORTABLE POWER SOURCE TO PROVIDE POWER TO AN ELECTRONIC DEVICE VIA AN INTERFACE

CROSS-REFERENCE TO RELATED APPLICATIONS

This application is also related to: (i) U.S. Provisional Patent Application No. 60/642,276, filed Jan. 7, 2005, entitled "PORTABLE MEDIA DEVICE AND IMPROVED PLAYLIST PROCESSING ON MEDIA DEVICES," which is hereby incorporated herein by reference; (ii) U.S. Provisional Patent Application No. 60/642,340, filed Jan. 7, 2005, entitled "ACCESSORY AUTHENTICATION FOR ELECTRONIC DEVICES," which is hereby incorporated herein by reference; (iii) U.S. patent application Ser. No. 11/031,288 filed Jan. 7, 2005, entitled "METHOD AND SYSTEM FOR DISCOVERING A POWER SOURCE ON A PERIPHERAL BUS," which is hereby incorporated herein by reference; (iv) U.S. patent application Ser. No. 11/031,301, filed Jan. 7, 2005, entitled "CONNECTOR SYSTEM," which is hereby incorporated herein by reference; (v) U.S. patent application Ser. No. 10/833,689, filed Apr. 27, 2004, entitled "CONNECTOR INTERFACE SYSTEM FOR MULTI-COMMUNICATION DEVICE," which is hereby incorporated herein by reference; (vi) U.S. patent application Ser. No. 10/278,752, filed Oct. 22, 2002, entitled "METHODS AND APPARATUS FOR CHARGING A BATTERY IN A PERIPHERAL DEVICE," which is hereby incorporated herein by reference; (vii) U.S. patent application Ser. No. 10/125,893, filed Mar. 18, 2002, entitled "POWER ADAPTERS FOR POWERING AND/OR CHARGING PERIPHERAL DEVICES," which is hereby incorporated herein by reference.

BACKGROUND

1. Technical Field

The present patent application relates to portable power sources and, in particular, relates to a portable power source operable to selectively provide power to a device connected to an interface of the portable power source.

2. Description of the Related Art

Portable electronic devices, such as Portable Digital Assistants and media players, typically include one or more rechargeable batteries housed permanently (or somewhat permanently) within the portable electronic device. These portable electronic devices sometimes also have peripheral bus ports that are able to support peripheral buses, such as Universal Serial Bus (USB) or FIREWIRE (IEEE 1394) bus ports. Peripheral buses are used to provide data communications with electronic devices as well as to provide limited amounts of power to the electronic devices. The power typically originates from a host computer to which the electronic device is connected via the peripheral bus.

In some situations, it can be impossible, or very inconvenient, to recharge the internally-housed batteries of a portable electronic device. This is typically due to lack of access to a suitable source of power. For example, many airliners do not have available a source of power suitable to recharge batteries of portable electronic devices.

On the other hand, external batteries (e.g., disposable AA batteries) can be somewhat easily obtained and carried to operate a portable electronic device in situations where the internally-housed rechargeable batteries are discharged and a source of recharge power is not conveniently available. However, configuring a portable electronic device to accommodate the use of both external batteries and internally-housed rechargeable batteries can be detrimental to the portability of the device.

Thus, there is a desire to accommodate the use of external batteries with portable electronic devices, while minimizing the detrimental effect to the portability of the electronic devices.

SUMMARY

Broadly speaking, in accordance with one aspect, a portable power source is configured for use with an electronic device.

The portable power source cooperates and communicates with the electronic device via an interface to which the electronic device is coupled. The portable power source includes circuitry to process a power request signal from the electronic device to determine whether a device connected to an interface of the portable power source is requesting power from the portable power source.

Typically, even if the connected electronic device has an internally-housed rechargeable battery, the internally-housed battery may be completely discharged. Thus, in accordance with some aspects, under some conditions, the portable power source provides power to the electronic device for at least a predetermined amount of time without consideration of the power request signal. The electronic device can use the power provided from the portable power source during this predetermined amount of time to boot up or otherwise arrive at a steady state condition, if not already at a steady state condition, so the electronic device can definitively determine whether to provide the power request signal to the portable power source.

An example of a condition under which the portable power source may provide power to the electronic device without consideration of the power request signal includes an initialization condition, in which the portable power source is unaware of the state of the electronic device.

An initialization condition may include, for example, a condition when electronic device is first connected to the portable power source after being not connected or, regardless of whether the electronic device is already connected to the portable power source, when external batteries are first inserted into the portable power source.

This summary is not intended to be all-inclusive. Other aspects will become apparent from the following detailed description taken in conjunction with the accompanying drawings, as well as from the appended claims.

DETAILED DESCRIPTION

A portable power source, particularly suitable for use with an electronic device, is now described. Examples and aspects are discussed below with reference to FIGS. 1, 1A, 2 and 3. However, it should be understood that the detailed description given herein with respect to these figures is for explanatory purposes only, and not by way of limitation.

Figure 1:
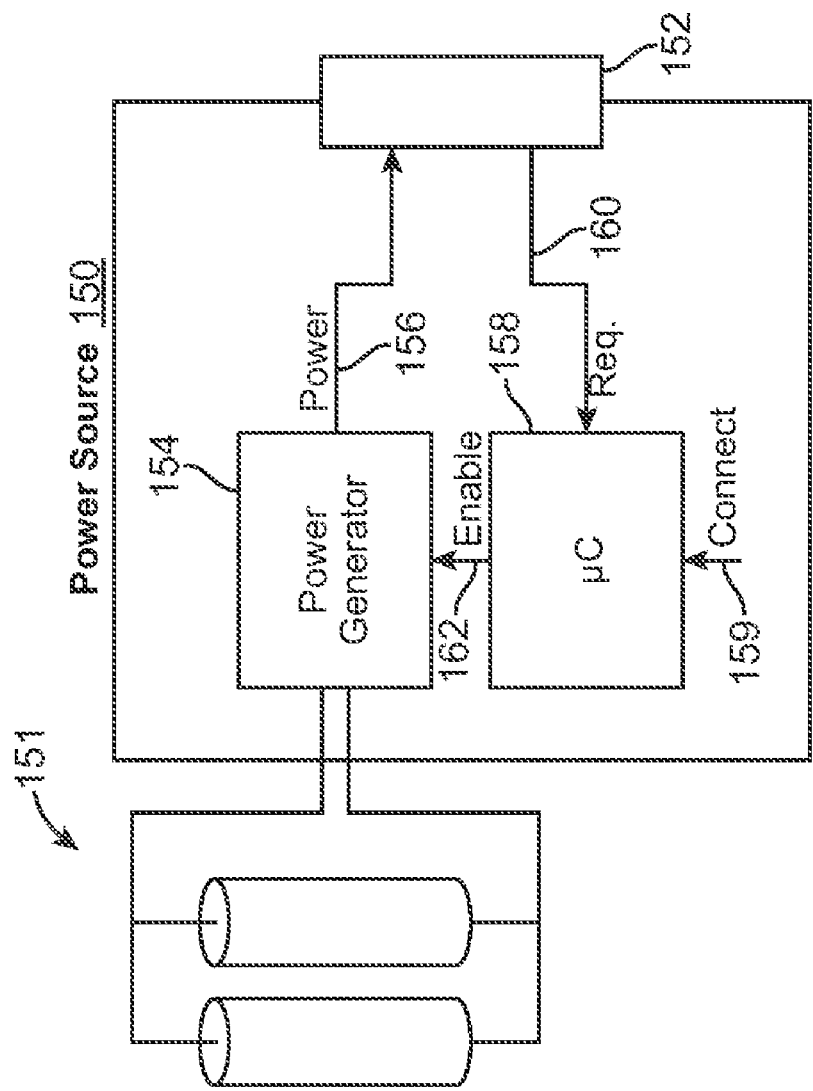
FIG. 1 illustrates a block diagram of a portable power source in accordance with an aspect.

FIG. 1 is a block schematic diagram of a portable power source 150 in accordance with one aspect. Referring to FIG. 1, external batteries 151 provide a renewable source of power for the power generator 154 to generate a power signal 156. The power signal 156 is provided to an interface 152. A microcontroller 158 is configured to receive a "connect" signal that indicates whether an electronic device is connected to the power source 150. The microcontroller 158 is also configured to receive a "request" signal that indicates whether a connected electronic device is requesting that the power signal 156 be provided to the electronic device. Based on the request signal 160 and the connect signal 159, the microcontroller 158 controls the state of an enable signal 162 provided to the power generator 154. The power generator 154 operates in consideration of the state of the enable signal 162.

Figure 1A:
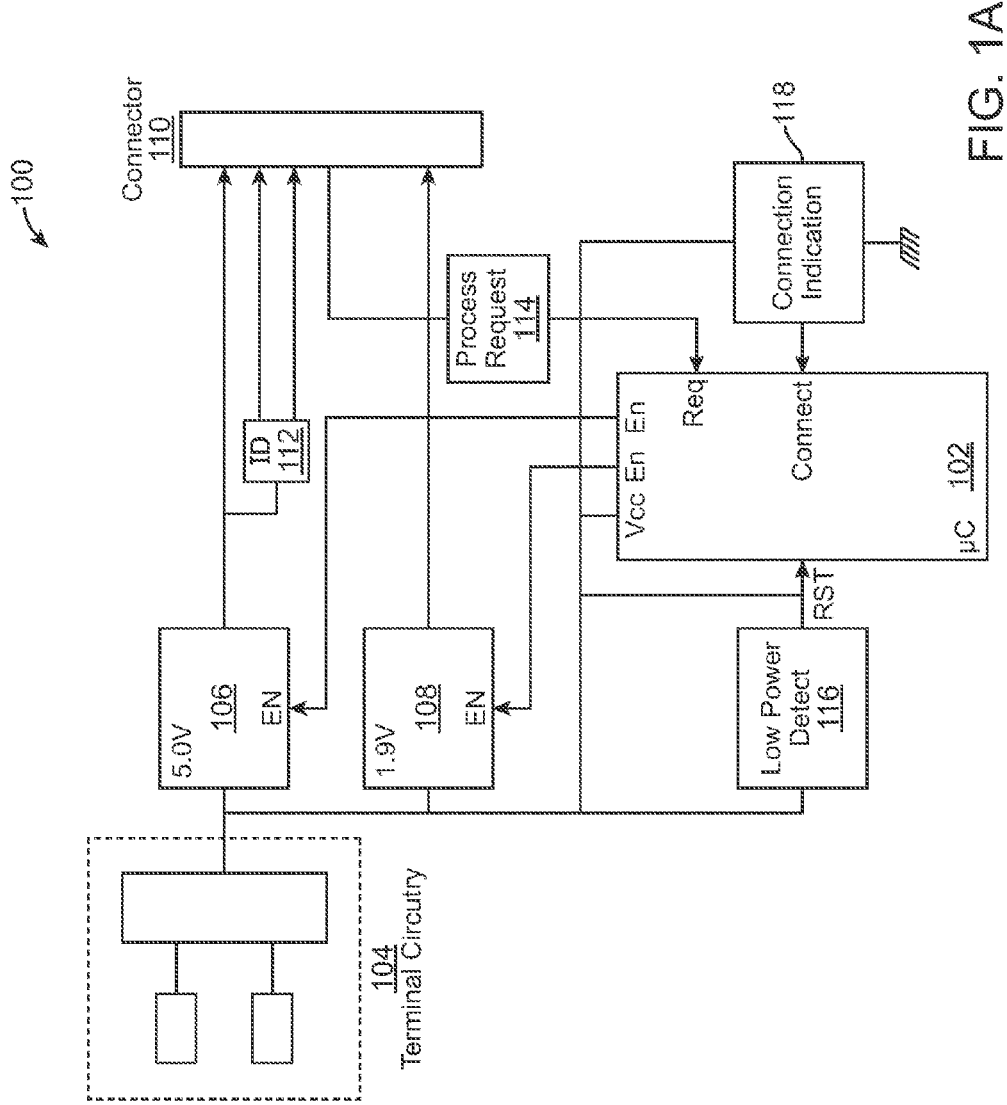
FIG. 1A illustrates a more detailed block diagram of a portable power source in accordance with an aspect.

FIG. 1A is a more detailed block schematic diagram of a portable power source 100 in accordance with an aspect. Before discussing the block schematic diagram of FIG. 1A, however, it is useful to consider the system diagram in FIG. 3.

Figure 3:
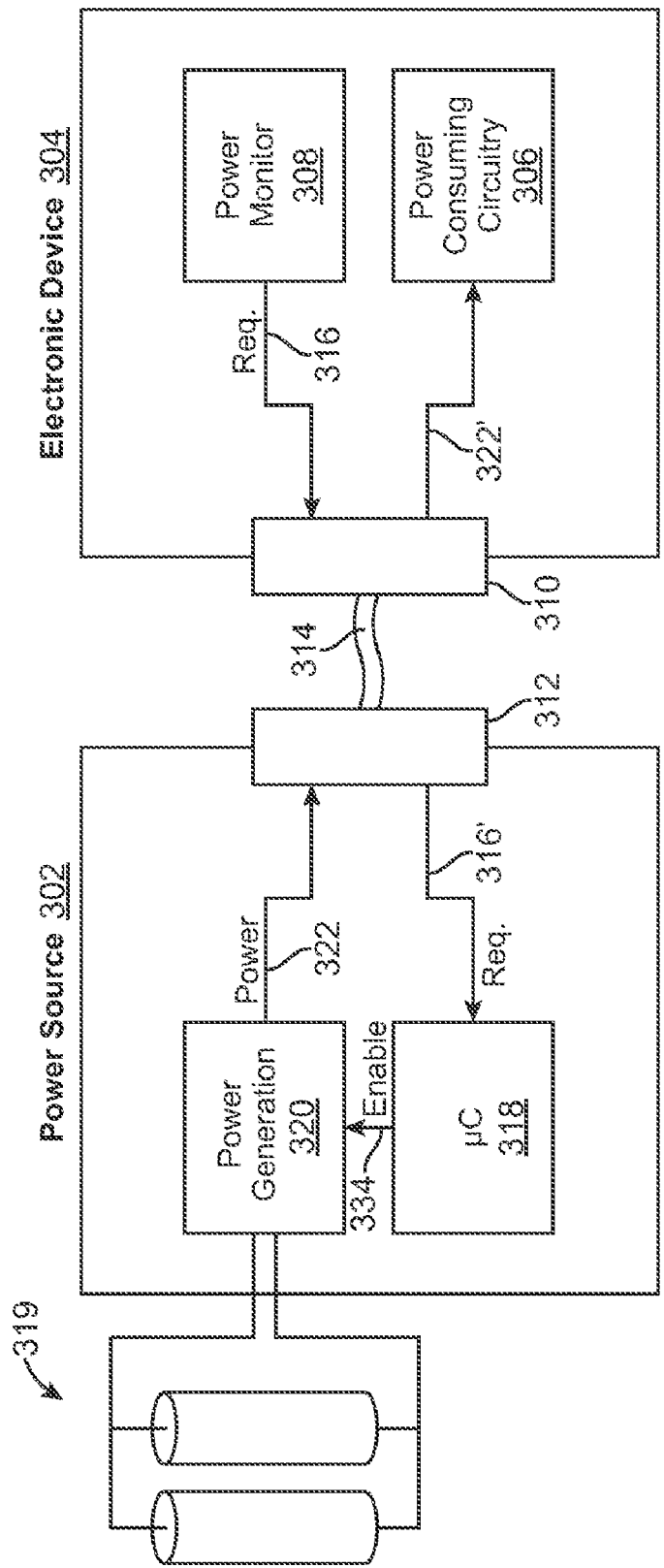
FIG. 3 illustrates a power source at a relatively high level, with an electronic device connected to it

In particular, FIG. 3 illustrates the power source 100 (referred to in FIG. 3 by reference numeral 302) in the context of an electronic device 304 that is connected to receive power from the power source to power the operation of the electronic device 304. Looking first at the electronic device 304, the electronic device receives a DC power signal 322' (which, as will be discussed in a moment, originates as DC power signal 322 from the power source 302) via an interface connector 310. The interface connector 314 is connected to a counterpart interface connector 312 in the power source 302 by a cable 314.

Various configurations for the interface from the power source 302 may be employed. In FIG. 3, the configuration includes the interface connector 314, the counterpart interface connector 312 and the cable 314. In one example, either of the interface connectors 312 or 314 may not be present, and may be replaced by a more permanent connection.

Furthermore, in some examples, regardless of how many connectors are present, the interface may be a controlled interface, such as a Universal Serial Bus (USB) or Firewire (IEEE 1394) bus interface. In other examples, there may be little or no logic directly associated with it the interface.

Power consuming circuitry 306 in the electronic device 304 operates using the DC power signal 322'. A power monitor 308 monitors the power requirements of the consuming circuitry 306 and, when appropriate, generates a request signal 316 to request the power source 302 to provide the DC power signal 322. The request signal 316 is provided to the power source 302 via the interface connector 310 and cable 314.

A microcontroller 318 in the power source 302 receives the power request signal 316 as power request signal 316', via the interface connector 312 of the power source 302. In response to the power request signal 316', the microcontroller 302 provides an enable signal 324 to power generation circuitry 320 of the power source 302, which provides the generated power signal 322 to the interface connector 312. The power generation circuitry 320 generates the power signal 322 using power supplied from external batteries 319 connected to the power generation circuitry 320, and the power signal 322 is provided to the electronic device 304 via the cable 314 and interface connector 310.

Having considered the FIG. 3 system diagram of a power source and connected electronic device, we now consider the FIG. 1A block circuit diagram of the portable power source 100. In the manner discussed above with reference to FIG. 3, the portable power source 100 is connectable to an electronic device (not shown) via a connector 110. The connecter 110 provides an interface from the portable power source 100 to a port of a detachable electronic device.

The portable power source 100 includes a microcontroller 102 configured to control and coordinate the operation of various components of the portable power source 100. The portable power source further includes terminal circuitry 104 (terminals and associated circuitry) to receive power from, in the FIG. 1 example, two replaceable AA batteries. In the FIG. 1A example, circuitry 106 is provided to generate 5V power from the battery output, and circuitry 108 is provided to generate a 1.9V output from the battery output. The circuitry 106 and circuitry 108 operate based on the state of enable output signals from the microcontroller 102.

The circuitry 106 is coupled to provide the 5V power to a supply voltage pin (for example, to carry a "supply voltage" as defined by a USB interface standard) of the connector 110. The circuitry 108 is coupled to provide the 1.9V power on an additional power line pin of the connector 110. The "additional power line pin" may be, for example, a pin to carry a signal that is supplemental to the signals defined by the USB interface standard. For additional details on connectors having additional functionality, see U.S. patent application Ser. No. 10/031,301, filed Jan. 7, 2005, entitled 'CONNECTOR SYSTEM," referred to above in the "CROSS-REFERENCE TO RELATED APPLICATIONS" section.

While the FIG. 1A block schematic diagram illustrates two power generation circuitry 106 and 108, generating 5V and 1.9V, respectively, the number of voltages, and their values, would generally be compatible with particular electronic devices expected to be connected to receive power from the power source 100 to power the operation of the electronic device 304

Referring still to FIG. 1A, circuitry 112 generates signal(s) coupled to data lines (for example, the "data lines" defined by the USB interface standard) in the connector 110. The generated signal(s) characterize the portable power source 100 to a connected electronic device. The generated signal(s) may comprise, for example, an "available power indicator" of the type disclosed in related patent application Ser. No. 10/961, 776, which was converted to U.S. Provisional Application No. 60/608,959 on Dec. 23, 2004.

Circuitry 114 processes a request signal from the electronic device, provided to the portable power source 100 via the connector 110, and provides an indication thereof to a "request" input of the microcontroller 102. The request signal from the electronic device indicates whether the electronic device is requesting power (i.e., the 5V and 1.9 V power generated by circuitry 106 and 108, respectively) from the portable power source 100.

Circuitry 118 generates a signal, to a "connect" input of the microcontroller 102, that indicates whether an electronic device is connected to the connector 110. While an electronic device is connected to the portable power source 100, the circuitry 118 generates a signal indicating such a connection and provides the signal to the microcontroller 102. Otherwise, a signal indicating such a connection is not provided to the microcontroller 102.

In one particular example, the circuitry 118 cooperates with complementary circuitry nominally present in the electronic device. That is, it is assumed that, the electronic device includes complementary circuitry in which the chassis ground and digital ground are connected. At the microcontroller 102, when the electronic device having the complementary circuitry is not connected to the connector 110, the "connect" pin of the microcontroller 102 is normally pulled high (through a resistor to Vcc). When the electronic device having the complementary circuitry is connected to the connector 110, the "connect" pin of the microcontroller 102 is pulled to digital ground.

Circuitry 116 is low power detection circuitry. Circuitry 116 evaluates the power available in the external batteries (connected to the terminal circuitry 104) and, when the available power falls below a particular threshold, generates a low-power indication signal to a reset input of the microcontroller 102. The thus-generated low-power indication signal holds the microcontroller 102 in a reset condition, resulting in the power generation circuitry 106 and 108 being controlled to cease generating power. This protects against the microcontroller 102 operating erratically due to a lower power condition, as well as minimizing the chance of damage (from leaking, for example) resulting from the external batteries being excessively discharged.

Figure 2:
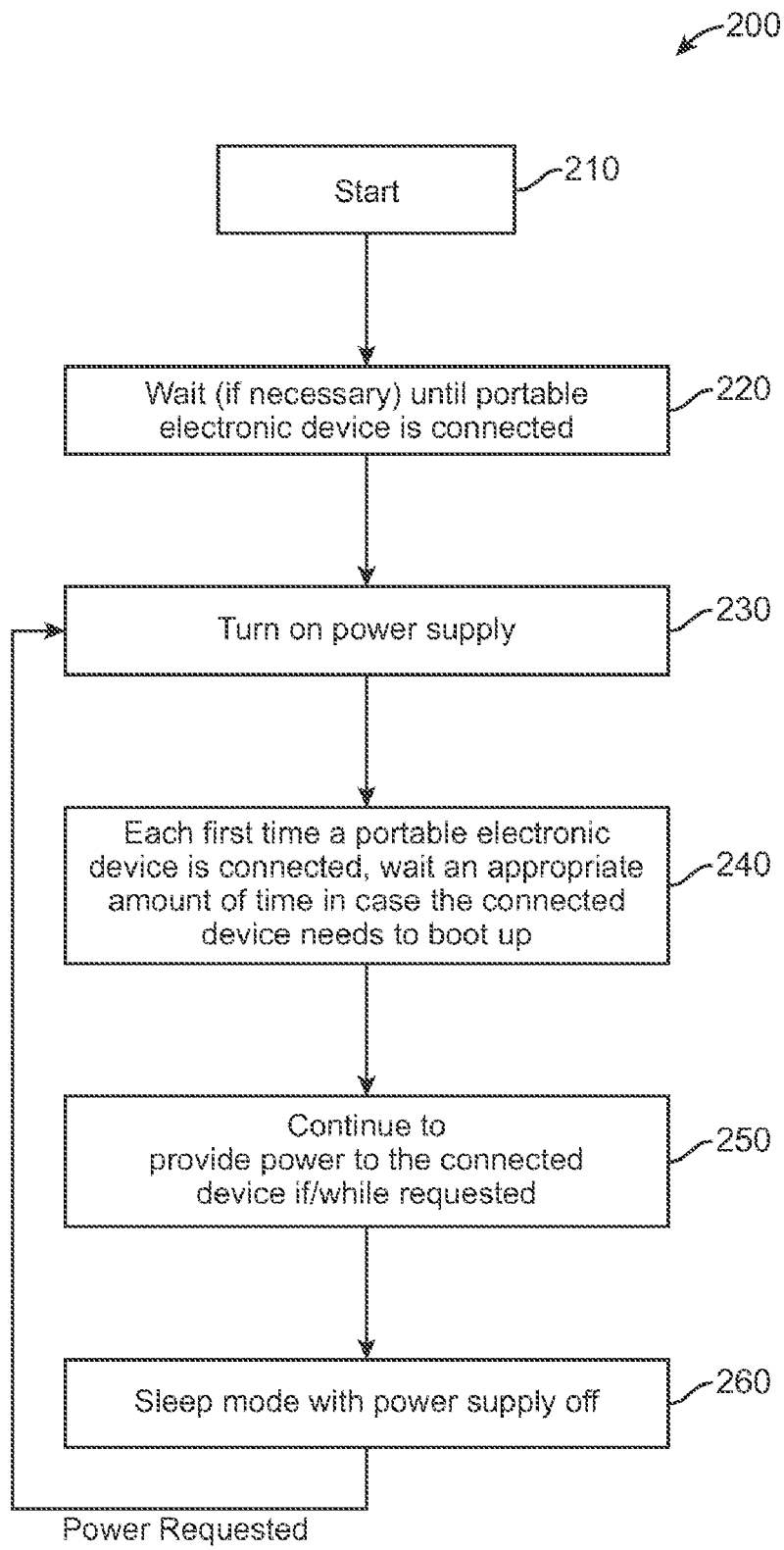
FIG. 2 illustrates a method implemented by a processor of the FIG. 1 portable power source.

Having described the circuitry of the portable power source 100 with reference to FIG. 1A, we now refer to FIG. 2 to describe how the FIG. 1A portable power source 100 may operate in accordance with one example. In particular, program memory associated with the microcontroller 102 holds one or more programs which, when executed by the microcontroller 102, controls a process to operate the portable power source 100, including the interoperation of the portable power source 100 with a connected electronic device.

Referring to FIG. 2, a process 200 to operate the portable power source 100 is now described. The process stays at step 210 until external batteries are connected to the terminal circuitry 104. In step 210, the microcontroller is in an unpowered condition. When external batteries are connected to the terminal circuitry 104, the microcontroller 102 powers up, leaves a reset condition, and begins to execute program instructions.

At step 220, the microcontroller 102 waits (if necessary) for an electronic device to be connected to the connector 110. As discussed above, in the FIG. 1A example, circuitry 118 of the portable power source 100 generates a signal indicating such a connection and provides the indication signal to the "connect" input of the microcontroller 102. When step 220 is first reached, an electronic device may already be connected, in which case processing proceeds to step 230.

At step 230, the microcontroller 102 executes instructions to control the circuitry 106 and the circuitry 108 to provide the 5.0V and 1.9 V output, respectively. In one example, this comprises asserting an enable line from separate output pins of the microcontroller 102 to respective enable inputs of the respective power generation circuitry 106 and 108. In one example, the microcontroller 102 executes the instructions such that there is a time delay of 100 msec between controlling the circuitry 106 to provide the 5.0V output and subsequently controlling the circuitry 108 to provide the 1.9V output.

Step 240 is essentially a "waiting" step, and step 240 is executed only each time in the process 200 that step 220 is executed. In particular, at step 240, the microcontroller 102 executes instructions to wait an appropriate amount of time (for example, five seconds) for the connected electronic device to "boot up." This wait is to accommodate a connected electronic device whose internal battery may itself insufficient for the electronic device to be operating. In such a case, the connected electronic device has to rely on the power being provided from the portable power source 100 to boot up and to begin to operate.

Step 240 is typically executed only one time after an electronic device is determined to be connected at step 220 since, at this time, the state of the internal battery of the connected electronic device is unknown. Subsequently, when step 240 is reached, it is known that the connected electronic device is already booted up and operating, so step 240 is skipped in this instance.

While not shown explicitly in FIG. 2, at any time it is detected (typically, asynchronously) that the electronic device is no longer connected to the port of the portable power source 100, processing returns to step 220 to wait until the electronic device is again connected.

At step 250 (after waiting at step 240, as appropriate), the microcontroller 102 executes instructions to determine whether the connected electronic device is asserting a signal to indicate a request by the connected electronic device, processed by the circuitry 114 of the portable power source 100 (as discussed above), for power from the portable power source 100. Using the FIG. 1A example, the microcontroller 102 executes instructions to inspect the "request" input to the microcontroller 102.

As long the microcontroller 102 determined that the connected electronic device is requesting power from the portable power source 100, and assuming the power generation circuitry 106 and 108 is not disabled due to the low power detection circuitry 116 detecting a low power condition of the batteries (which, as discussed above, puts the microcontroller 102 into a reset condition, in one example), processing stays at step 250. While processing stays at step 250, the microcontroller continues to control the power generation circuitry 106 and 108 to provide power to the connected electronic device.

On the other hand, when the connected electronic device discontinues requesting power from the portable power source 100, processing goes to step 260. At step 260, the microcontroller 102 executes instructions to go into a "sleep mode." In the sleep mode, the microcontroller 102 executes instructions to disable the power generation circuitry 106 and 108, which conserves the charge in the external batteries. If the connected electronic device again requests power from the portable power source 100, then processing returns to step 230.

Having now described a process 200 to operate the portable power source 100, it is noted that, in a normal operating state, the operation of the power generation circuitry 106 and 108 is at the request of the connected electronic device. Typically, a connected electronic device would not employ the portable power source 100 as a power source to charge the internal battery of the connected electronic device.

However, the configuration of the portable power source 100 does not prevent the electronic device from employing the portable power source 100 in such a manner. In fact, in some examples, such as a particular example of a portable media player, the electronic device is designed to preserve certain information in its internal memory even when "powered off." Such information may include, for example, an indication of which song was playing when the electronic device was powered off. The electronic device requires a minimum amount of power to its internal memory to preserve the information. Thus, the electronic device may employ a small amount of power from the portable power source 100 to raise its internal battery to a minimum level of charge, to power its internal memory to preserve the information.

The various described aspects, examples, implementations or features can be used separately or in any combination.

The invention is preferably implemented by hardware, software or a combination of hardware and software. As an example, processing of certain signals may be accomplished in some cases by polling a signal state and, in other cases, using a combination of interrupt hardware and interrupt handler software.

The software can be embodied as computer readable code on a computer readable medium. The computer readable medium is any data storage device that can store data that can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

One example of an ornamental design for a portable power source is provided in U.S. Design Patent Application No.: 29/220,307, filed Dec. 23, 2004, entitled "BATTERY PACK," which is hereby incorporated herein by reference.

The advantages of the invention are numerous. Different aspects, embodiments or implementations may yield one or more advantages. One advantage that an embodiment of the invention may have is that an electronic device may be conveniently powered using a portable power source.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A power source, comprising:
an interface;
power generating circuitry operatively coupled to generate and provide power to an electronic device via the interface;
control circuitry configured to control the power generating circuitry to selectively generate and provide power to the electronic device based on a state of a power request signal provided from the device via the interface;
the control circuitry is further configured to:
make an initial determination that the electronic device is connected to the interface of the power source; and
based on making the initial determination, determine whether to control the power generating circuitry to selectively generate and provide power to the electronic device based on the state of the power request signal provided from the device via the interface;
after making the initial determination that the electronic device is connected to the interface of the power source and controlling the power generating circuitry to selectively generate and provide power to the electronic device based on a state of a power request signal provided from the device via an interface, controlling the power generating circuitry to generate and provide power to the electronic device for a predetermined amount of time regardless of whether the electronic device is requesting power from the power source.

2. The power source of claim 1, wherein:
the control circuitry is further configured to determine whether the electronic device is no longer connected to the interface of the power source.

3. The power source of claim 2, wherein:
the control circuitry is further configured to, based on determining that the electronic device is no longer connected to the interface of the power source, controlling the power generating circuitry to refrain from generating and providing power to the electronic device.

4. The power source of claim 3, wherein:
the control circuitry is further configured to, after determining that the electronic device is no longer connected to the interface of the power source, treating a subsequent determination as an initial determination.

5. The power source of claim 1, wherein:
the control circuitry is configured to execute initialization processing when external batteries are connected to the power source.

6. The power source of claim 5, wherein:
the control circuitry is further configured to stop selectively operating the power generating circuitry to generate and provide the power to the electronic device when
the external batteries are disconnected from the power source; or
the power from the external batteries is below a predetermined threshold.

7. The power source of claim 1, further comprising:
circuitry that provides a signal to characterize the power source to the connected electronic device.

8. The power source of claim 7 wherein:
the signal to characterize the power source comprises an available power indicator signal.

9. The power source of claim 1, wherein:
the control circuitry includes a connect input for a signal indicating whether an electronic device is connected to the interface of the power source.

10. The power source of claim 9 further comprising connection indication circuitry that is configured to generate the signal indicating whether an electronic device is connected to the interface of the power source.

11. The power source of claim 10 wherein:
the connection indication circuitry comprises a resistor coupled to pull high the connect input of the control circuitry.

12. The power source of claim 1, wherein:
the power generating circuitry includes a 5 volt power generating circuit.

13. The power source of claim 12, wherein:
the power generating circuitry additionally includes a 1.9 volt power generating circuit.

14. The power source of claim 1 wherein:
the power generating circuitry comprises a first power circuit configured to generate a first power supply voltage and a second power circuit configured to generate a second power supply voltage that is lower than the first power supply voltage.

15. The power source of claim 14 wherein:
the first power supply voltage corresponds to a supply voltage as defined by USB interface standard.

16. The power source of claim 14 wherein:
the first power supply voltage is 5 V and the second power supply voltage is 1.9 V.

17. The power source of claim 1 further comprising request signal processing circuitry configured to receive and process the power request signal.

18. The power source of claim 1, wherein:
the interface of the portable power source is a USB compatible connector.

19. The power source of claim 18, wherein:
the USB compatible connector includes an extra contact which is supplemental to a standard USB contact configuration.

20. The power source of claim 19, wherein:
the power generating circuitry generates a first power supply voltage for a first USB power supply contact of the interface, and a second lower power supply voltage for the extra contact.

21. The power source of claim 20 wherein:
the first power supply voltage is 5 V and the second power supply voltage is 1.9 V.

22. The power source of claim 1, wherein:
the interface of the portable power source is a firewire compatible connector.

23. The power source of claim 1, further comprising terminal circuitry configured to receive power from a portable source of power and to supply power to the power generating circuitry.

24. The power source of claim 23 wherein:
the portable source of power comprises at least one battery.

25. The power source of claim 24, wherein:
the at least one battery is an AA battery.

26. The power source of claim 1, wherein:
the power generating circuitry of the power source generates DC power from a DC source.

27. The power source of claim 1, further comprising a cable detachably coupled to the interface.

28. The power source of claim 27, wherein:
the cable includes a USB compatible connector.

29. The power source of claim 1, wherein:
the portable power source additionally includes low power detection circuitry configured to monitor the ability of the power generating circuitry to generate and provide power.

30. The power source of claim 29, wherein:
the low power detection circuitry signals to the control circuitry to reset when available power from power generating circuitry falls below a preset threshold.

31. The power source of claim 1, wherein:
the control circuitry is additionally configured to provide a waiting step, to allow the electronic device to boot up.

32. The power source of claim 31 wherein:
the control circuitry may supply power to the electronic device during the waiting step.

33. The power source of claim 1, wherein:
the control circuitry is additionally configured to enter into a sleep mode, to disable the power generating circuitry, after the predetermined amount of time has elapsed.

* * * * *